Oct. 13, 1931.  J. E. BOYNTON  1,826,725
COUPLING IN AN APPARATUS FOR EXTRUDING MATTER
Original Filed May 31, 1929   3 Sheets-Sheet 1

Inventor
J. E. Boynton
By H. B. Whitfield Att'y.

Oct. 13, 1931.   J. E. BOYNTON   1,826,725
COUPLING IN AN APPARATUS FOR EXTRUDING MATTER
Original Filed May 31, 1929   3 Sheets-Sheet 2
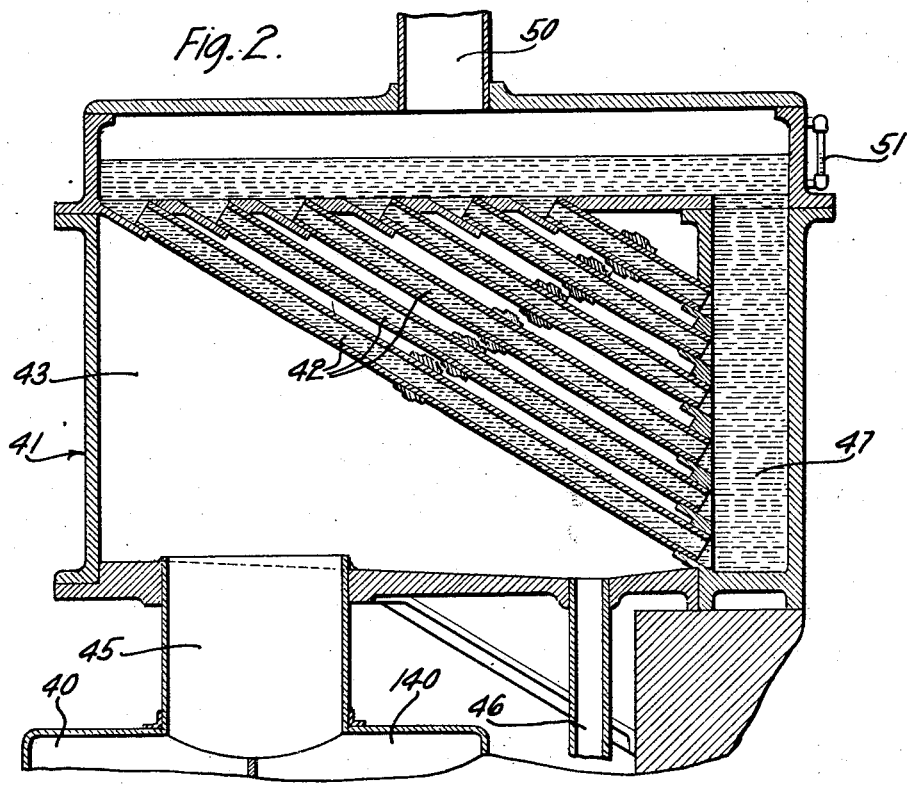
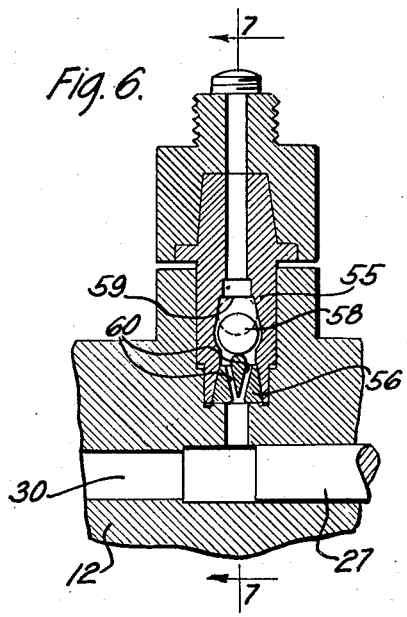
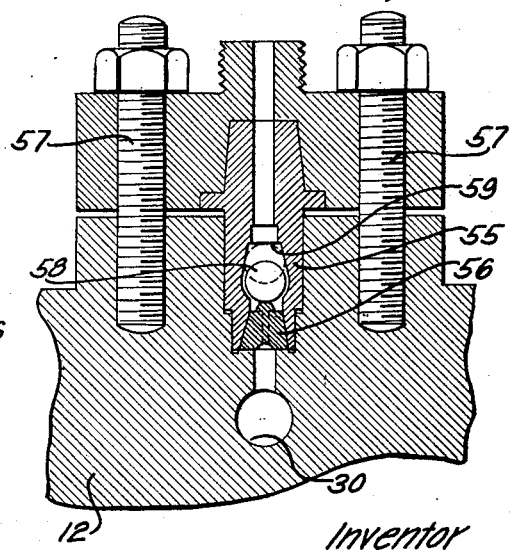
Inventor
J. E. Boynton
By H. B. Whitfield Att'y.

Oct. 13, 1931.  J. E. BOYNTON  1,826,725
COUPLING IN AN APPARATUS FOR EXTRUDING MATTER
Original Filed May 31, 1929  3 Sheets-Sheet 3
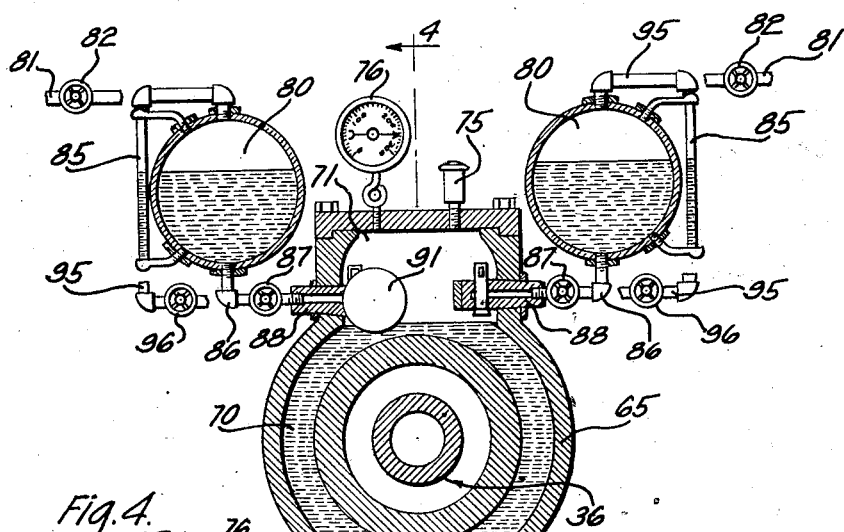
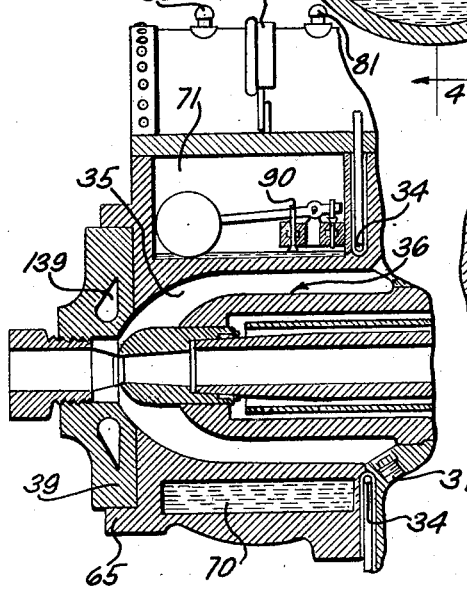
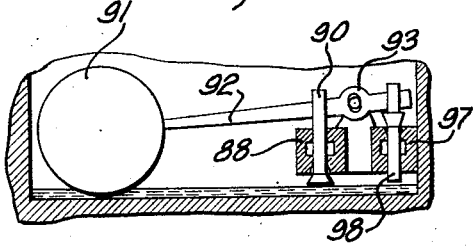
Inventor
J. E. Boynton
By H. B. Whitfield Att'y Patented Oct. 13, 1931

1,826,725

UNITED STATES PATENT OFFICE

JOHN E. BOYNTON, OF OAK PARK, ILLINOIS, ASSIGNOR TO WESTERN ELECTRIC COMPANY, INCORPORATED, OF NEW YORK, N. Y., A CORPORATION OF NEW YORK

COUPLING IN AN APPARATUS FOR EXTRUDING MATTER

Original application filed May 31, 1929, Serial No. 367,204. Divided and this application filed March 7, 1930. Serial No. 433,870.

This invention relates to a method of and apparatus for extruding matter, and more particularly to a method of and apparatus for extruding metals, and is a division of my copending application Serial No. 367,204, filed May 31, 1929.

An object of the invention is to provide improved means for preventing leakage between joined portions of apparatus employing very high pressures.

In its preferred form the invention comprises improvements in the extruding machine described in detail in Patent No. 1,720,759, issued July 16, 1929, to John E. Boynton.

A feature of the invention is an improved mechanical construction wherein the cylinders of the pumps which are employed to pump the liquid matter in such a manner as to force a head of solid matter through an extruding orifice, are formed in a single casting or forging to allow for the passage of the matter to be extruded. A recess in the jointure between the member referred to and the head member allows the insertion of a pipe for the circulation of a cooling element such as air or water, the matter extruded being solidified by this means to prevent leakage thereof through the joint made by the two members.

The intake passage for admitting extrudable matter to each pump is provided with an improved intake valve wherein a valve member is provided of lighter weight than an equal volume of the matter extruded, the valve member being thereby adapted to float to its seat to close the intake passage. The seat is provided within a member having a portion of cylindrical cross section, the lower portion thereof having a wedge-like or feathered edge. A conical gland is provided having a port to permit passage of matter therethrough so that the member of cylindrical cross section may be forced with a wedge-like action between the gland and the side walls of the passageway to which the valve is adapted to supply matter.

Other objects and features of the invention will become apparent as the detailed description progresses, reference being had to the accompanying drawings, wherein Fig. 1 is a side elevation, partly in section, of an extruding machine embodying the features of the invention, part of the view being cut away;

Fig. 2 is an enlarged vertical section of that portion of the apparatus of Fig. 1 which has been cut away and shows one embodiment of apparatus for maintaining a definite predetermined temperature in a portion of the extruding machine;

Fig. 3 is a sectional view of a modified form of apparatus for maintaining a definite predetermined temperature such as would be taken on the line 3—3 of Fig. 1 if the apparatus were constructed to employ a modified type of apparatus;

Fig. 4 shows a longitudinal central sectional view of the modified apparatus shown in Fig. 3, the section being taken on the line 4—4 of Fig. 3;

Fig. 5 is an enlarged sectional view of the valve for controlling the volume of liquid admitted into the apparatus shown in Figs. 3 and 4;

Fig. 6 is an enlarged sectional view of a portion of the mechanism shown in section in Fig. 1, and Fig. 7 is a sectional view taken on the line 7—7 of Fig. 6.

Figure 1:
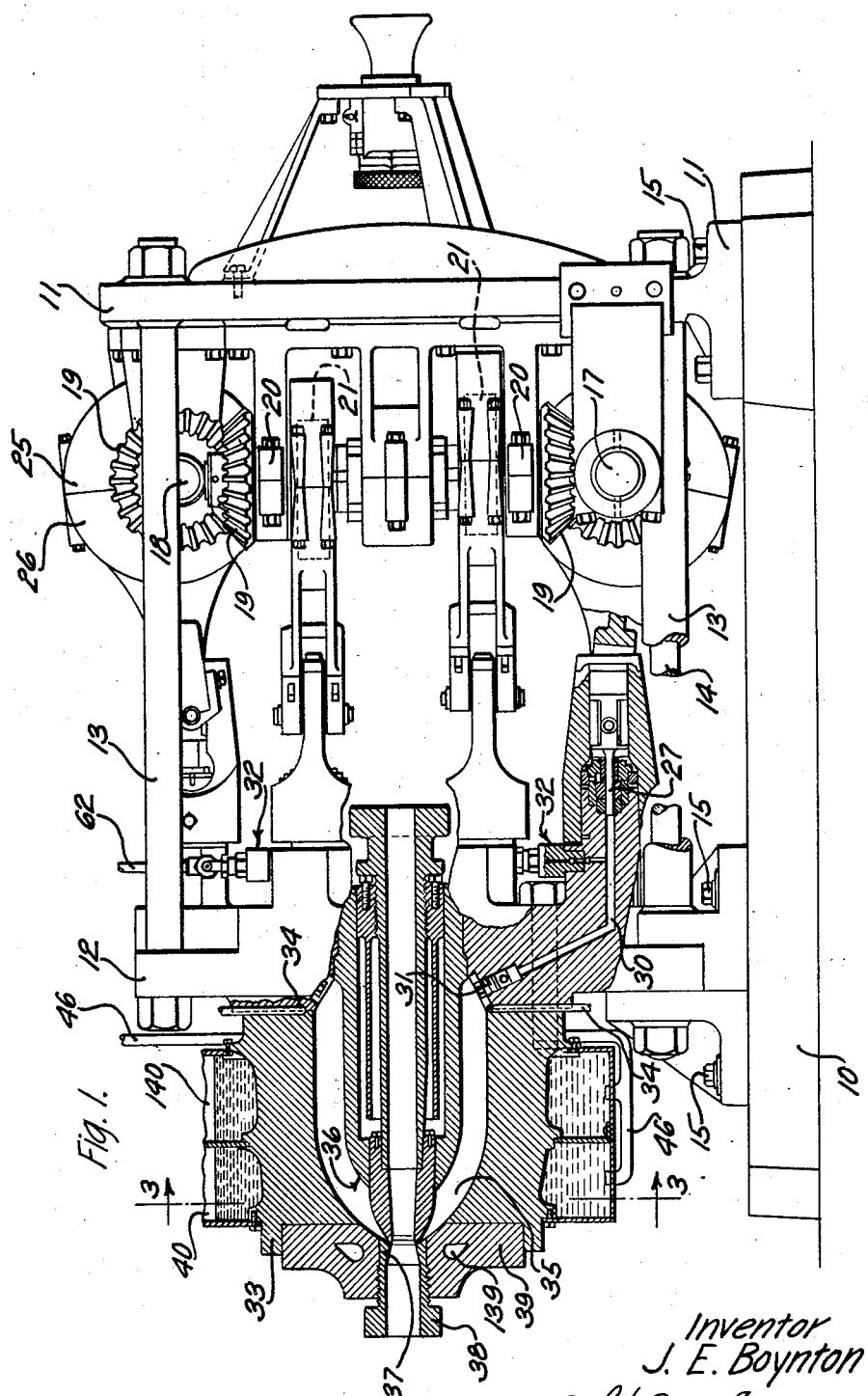

Referring now to the accompanying drawings wherein like numerals designate similar members throughout the several views, the reference numeral 10 designates a base plate upon which is mounted the mechanism of an improved extruding machine embodying the main features of the invention. The main details of the mechanism together with the mode of operation correspond with that of the mechanism disclosed in the Boynton patent above referred to. The main points of difference with the exception of improvements which will be referred to more in detail hereinafter is that in the prior machine, twelve cylinders are employed whereas in the mechanism shown in elevation in Fig. 1, eight cylinders are used.

A brief description of the pumping mechanism shown in Fig. 1 will now be given. A standard 11 is held in spaced relation to a cylinder member 12 by a plurality of spacing rods 13 and tie rods 14, the cylinder member 12 and the standard 11 being held in an upright position by suitable means such as bolts 15—15. A shaft 17 leading to a suitable source of power (not shown) distributes the power evenly to a plurality of other shafts 18 by means of suitable bevel gears 19 secured to the several shafts. Each of the shafts 18 is supported by a plurality of bearings 20 which are suitably secured to the standard 11, and carry a pair of eccentrics 21 which function with eccentric straps 25 and eccentric rods 26 to suitably operate a plurality of plungers 27.

A plurality of ducts 30 are bored in the cylinder member 12 and cooperate with the plungers 27 to form the pumps which force the matter into the extruding chamber. A check valve 31 in each one of the ducts 30 prevents a back flow of extrudable matter and a valve member 32, which will be described more in detail hereinafter, permits a flow of the matter such as molten lead or lead alloy from a suitable source through suitable ducts to the ducts 30. A head member 33 is secured by suitable means to the cylinder member 12, an aperture being provided in the jointure to permit the insertion of a pipe 34 through which temperature regulating fluid may be passed for the purpose of solidifying any portions of the matter being extruded which may be forced within the joint between the two members, to prevent leakage therethrough. The head member 33 is provided with an annular passage 35, which forms the main extrusion chamber of the machine, and a core tube assembly designated generally by the numeral 36 extends into the chamber 35 and cooperates with a die member 37 which is secured to the head member 33 by a die holding nut 38 and may be adjusted longitudinally by a die block 39 to shape the material being extruded.

The mechanism is particularly adapted to the extrusion of lead or other similar metals or alloys which melt at a comparatively low temperature. As described in the Boynton patent referred to above, the material is pumped continuously in a liquid state and then solidified while in the extrusion chamber 35, the material being forced out through the extrusion opening in the form of a solid. When employing the extruding mechanism for this purpose it may be desirable to provide means whereby the head member 33 together with a portion of the material contained therein may be maintained at a definite predetermined temperature.

A structure is shown in Fig. 2 by means of which this can be accomplished, this structure being adapted for use where the head member 33 is analogous in structure to the form thereof shown in section in Fig. 1. In this portion of the structure containers 40 and 140 surround the extruding head 33 and are adapted to contain a liquid with which the head member of the extruding mechanism will be cooled. A condenser designated generally by the numeral 41 surmounts the containers 40 and 140 and is adapted to condense vapors arising from said containers by means of a plurality of ducts 42 extending obliquely through a condenser chamber 43, the ducts 42 being cooled by the circulation therethrough of a suitable cooling liquid. A passageway 45 is provided from the containers 40 and 140 and to the condenser chamber 43 for the purpose of permitting vapors arising from said containers to enter the condenser chamber, and a bifurcated pipe 46 is suitably positioned with respect to the condenser chamber to conduct the condensed vapor back to the containers 40 and 140. An L-shaped chamber 47 partially encloses the condenser chamber 43, the ducts 42 extending from one portion of the L-shaped chamber to another and being in communication therewith, there being, however, no interconnection between the condenser chamber 43 and the L-shaped chamber 47 such as to permit liquid contained in the chamber 47 actually entering the chamber 43 but only into the ducts 42. A vapor passageway 50 permits discharge of vapor from the liquid contained in the L-shaped member 47 and an indicator glass 51 suitably mounted with respect to the chamber indicates the amount of liquid contained therein.

The operation of the cooling mechanism described above is briefly as follows: Either or both of the containers 40 and 140 are filled to a suitable height with a liquid, the boiling point of which bears a predetermined relationship to, or may possibly coincide exactly with, the temperature sought to be maintained within the head member 33 which is substantially the temperature at which the lead or other material will be extruded. The flow of hot extrudable matter through the chamber 35 causes a heating of the head member 33, the consequent boiling of the liquid within the containers 40 and 140 and the vaporization of a portion thereof, the resulting vapor arising into the condenser chamber 43. The uncondensed portion of the liquid within the containers 40 and 140 is prevented from exceeding the boiling temperature thereof by the liberation of the latent heat required for the vaporization of portions of the liquid. The vapor arising into the chamber 43 strikes against the relatively cool ducts 42 and is condensed, the resulting condensate flowing along the exteriors of the ducts 42 and being conducted again to the containers 40 and 140 in the original form of liquid through the pipe 46. The liquid contained within the L-shaped chamber 47 and the ducts 42 is preferably one that boils at a considerably lower temperature than the liquid within the containers 40 and 140, and the heat required for the vaporization of this liquid can be employed to keep it at a sufficiently low temperature so that it will act to condense the vapor arising from the higher boiling point liquid.

When employing the extruding machine for the purpose of covering cable cores with a sheath of lead-antimony alloy, the liquid used in the containers 40 and 140 may be nitro-benzol, benzyl-alcohol, ethylbenzoate or any similar liquid which boils at approximately the temperature desired to be maintained. The liquid utilized in the L-shaped chamber 47 may be water. When employing two liquids having different boiling temperatures with the construction shown and for the purpose indicated, substantially atmospheric pressures can be maintained throughout the whole cooling system, the cooling effect being obtained solely by utilizing the heat of vaporization of the two liquids.

When employing a mechanism of the class described for the purpose of extruding metals or such other materials as must be handled under high pressures, it is necessary to prevent leakage in places where portions of the mechanism are joined together. In the extruding mechanism described in the Boynton patent referred to above and in the improved form thereof which is the subject matter of the present invention, it is particularly desirable that the intake passage and the check valve associated therewith be of such a nature as to positively prevent leakage therearound or back flow into the source of supply of the matter being handled. Figs. 6 and 7 show enlarged views of the valvular member referred to above and generally designated in Fig. 1 by the numeral 32. A member 55, a portion of which has substantially cylindrical conformation, is provided with a lower portion, individual sections along the wall of which lower portion are wedge-like in shape. A gland member 56 having ports 60 cooperates with the side wall of a recess in a portion of the cylinder member 12 to which the intake passage leads, to form a circular crevice into which the lower portion of the member 55 is adapted to extend. The member 55 is preliminarily brought into position by means of bolts 57. A valvular member 58, which is shown in the accompanying drawings as a sphere, cooperates with a seat 59 to form a valve by means of which the flow of liquid matter to the mechanism may be controlled. A threaded portion of the member 61 permits a pipe 62 to be secured thereto, the pipe 62 (Fig. 1) leading to a suitable scource of supply of liquid matter (not shown).

As shown in the accompanying drawing (Figs. 6 and 7), when the member 55 is brought into tight engagement between the gland 56 and the walls of the ducts in the cylinder member 12, whatever pressure is built up within the bore 30 which constitutes the cylinder of the extruding pump by the forward movement of the plunger 27, will act against the lower face of the gland 56 with the result that the engagement between the associated parts is closer and any movement of gland 56 which may occur will increase the effectiveness of the seal. In this manner the force employed to extrude the matter is utilized to prevent leakage thereof. The action of the valvular member 58 is such that when the piston 27 is withdrawn on its return stroke the valvular member will drop to the tip of the gland 56 as shown in a solid line position in Fig. 6. This permits downward passage of matter around the valvular member 58 and through the ports 60 in the gland 56. When the piston 27 begins its forward stroke the valvular member 58, being of steel or other material lighter than lead, will float to its seat 59 and whatever pressure is built up within the port 30 forces it more tightly against its seat until the return stroke of the piston 27.

Figs. 3, 4, and 5 of the accompanying drawings show a modified form of mechanism by means of which the heat of vaporization of a liquid may be utilized to maintain selected portions of the extruding mechanism at a predetermined temperature. Referring particularly to Fig. 4, the reference numeral 65 designates a head member of an extruding mechanism corresponding to the member 33 as shown in Fig. 1. The member 65 is provided with a recess in which the core tube assembly 36 may be contained and the member 65 may be secured to the cylinder member 12 by suitable means, a temperature controlling pipe 34 being provided for the purpose of preventing leakage as described above. A chamber 70 in the member 65 surmounted by a dome 71, which is integral therewith, is adapted to contain a liquid which is utilized to cool the head member 65, the dome 71 functioning to receive the vapor arising from the liquid contained in the chamber 70. The temperature of the liquid contained within the chamber 70 is regulated by controlling the pressure maintained within the dome 71, a valve 75 being regulable to permit the exhaust of vapor from the dome 71 when the pressure therein is beyond a predetermined amount, and a pressure gauge 76 is provided to furnish the operator with means for learning the pressure condition within the dome 71.

Since the chamber 70 is maintained at the temperature desired by employing the heat of vaporization of liquid contained therein, it becomes necessary to resupply it with liquid, and it is furthermore desirable that the liquid be maintained at a definite and uniform level. Duplicate mechanism is shown in the accompanying drawings for accomplishing this purpose, but since the two units are identical, for the purpose of simplifying the description, they will be described as a single unit. An auxiliary tank 80 is positioned above the chamber 70 and is adapted to contain a reserve supply of the liquid which is employed, a pipe 81 communicating therewith and leading to a source of supply of the liquid (not shown), and a valve 82 being provided therein to discontinue or permit the flow of liquid from the source of supply into the auxiliary tank 80 as desired. Suitable means is provided such as an indicator glass 85 for the purpose of readily showing the amount of liquid within the auxiliary tank. A pipe 86 equipped with a valve 87 leads to a valve chamber 88 partly positioned within the dome 71 and a valve stem 90 (Figs. 4 and 5) which is actuated by a float 91 in cooperation with an arm 92 which is loosely pivoted at 93 cooperates with the valve to stop the flow of liquid from the auxiliary tank 80 to the chamber 70 in a manner and for a purpose which will be described more in detail hereinafter. A vapor transmitting pipe 95 communicating with the upper portion of the tank 80, is provided with a valve 96 and terminates in a valve chamber 97 which valve chamber is partially within the dome 71 and cooperates with a valve stem 98 which is controlled by the action of the arm 92 as described to close or open, as the case may be, the vapor passageway.

The mechanism functions in the following manner: When the level of the liquid within the chamber 70 is lowered, the float 91 is permitted to drop gravitationally and raise the valve stem 98 to permit the vapor pressure within the dome 71 to be extended to the upper portion of the auxiliary tank 80 through the pipe 95. This creates a pressure above the liquid within the auxiliary tank 80 which corresponds with that above the liquid within the chamber 70. At the same time the valve stem 90 is lowered, thereby permitting a flow of liquid from the tank 80 through the pipe 86, this being accomplished by gravity since the pressures within the tank and chamber have now become equalized. When the liquid has reached its proper level the raising of the float 91 causes a seating of the two valves, thus discontinuing all communication between the auxiliary tank and the chamber 70. When it is necessary to replenish the liquid in the auxiliary tank 80 the valves 87 and 96 leading to one of the units are closed and a supply of liquid admitted through the pipe 81 by opening the valve 82. When the liquid has reached a sufficient height as indicated in the glass 85, the valve 82 is closed and the valves 87 and 96 reopened whereupon the the unit is again in condition to function as described. It is obvious that while the liquid is being replenished in tank 80 of one of the units the opposing unit will function for the purpose and in the manner described. It is apparent that any suitable liquid may be used when employing a mechanism embodying the features described, but on account of the cheapness and ready accessibility of water, this liquid is preferred. Although good results may be obtained by employing the device with any class of extruding apparatus, particularly good results are obtained by utilizing it with the method of an apparatus for producing flux core solder described in my copending application, Serial No. 18,133, filed March 25, 1925.

When employing either type of cooling device utilizing the heat of vaporization; namely, either the device disclosed in Figs. 1 and 2 or the embodiment shown in Figs. 3, 4 and 5, it may be desirable for efficient operation of extruding machines to provide means for cooling the lead or other extrudable matter within the region of the die. To accomplish this result the die positioning member 39 may be formed with an annular chamber designated in the drawings by the numeral 139 for the purpose of introducing cooling material at this point. The material introduced may vary depending upon the specific results desired without departing from the spirit and scope of the invention, and the material introduced therein may be either circulated or permitted to vaporize as desired and consonant with the results to be obtained. It is preferable to employ water in the annular chamber 139 and maintain the water constantly at the boiling temperature by utilizing the heat of vaporization in the manner described in connection with the other portions of the mechanism. Any suitable inlets or outlets (not shown) may be provided, of course, to introduce the cooling material into the annular chamber.

When employing the improved extruding machine, which is the subject matter of the present invention, it is preferable that molten lead or other extrudable matter be introduced into the cylinders at a temperature only slightly above the melting temperature thereof so that the lead will have to be cooled only a slight amount before solidification before it is discharged from the extruding orifice. It is also desirable that the temperature of the lead be closely regulated so that too large a body of solid lead will not exist in the extruding chamber 35 because obviously the power required in the extruding operation is greatly increased when the volume of solid lead is increased. The embodiment shown in Figs. 1 and 2 is of particular utility for this reason because the three places in which cooling material can be introduced, namely the containers 40 and 140 and the annular chamber 139 in the die positioning member 39, can be used in a number of ways. For instance, liquids having different boiling points may be used in each one of the three containers in which event, of course, where a condenser is employed a different condenser would have to be used in connection with each one of the containers. At other times, particularly when starting the machine, either one or all of the containers 40 or 140 or the annular chamber 139 may be drained in order to more accurately control the temperature of the lead or other extrudable matter. It is obvious that more heat must be conducted away from the machine after it has been in operation for some time than when first starting. When the extruding operation first begins all of the parts of the extruding machine absorb heat and after the machine has been working for some time the parts which will absorb heat and in addition thereto the friction of the lead and the heat generated by the work thereon generally, introduces another source of heat, which heat the extruding machine must be designed to carry away. The advantage of a plurality of cooling means is therefore apparent.

In the embodiment shown in Figs. 3 and 4 only one chamber 70 is shown, but it is obvious that a plurality of chambers of this same general construction could be employed in order to more closely regulate the temperature of the matter being extruded. Although specific details are shown in the drawings and described in the specification, it is obvious that these details constitute only one embodiment of applicant's invention, which is to be limited accordingly only by the scope of the appended claims.

What is claimed is:

1. A coupling for fluid conduits, comprising a member provided with a recess communicating with one of the conduits, a tubular member movably mounted in said recess and provided with an inwardly tapering bore communicating with another conduit, an apertured member seated in said recess and having an outer surface shaped to engage said tapered bore in fluid-tight relation, a yoke engaging the tubular member, and means for urging the yoke toward the apertured member to maintain the parts in fluid-tight relation.

2. A coupling for fluid conduits, comprising a member provided with a recess communicating with one of the conduits, a tubular member movably mounted in said recess and provided with an outwardly tapering bore communicating with another conduit, an apertured member seated in said recess and having an outer surface shaped to engage said tapered bore in fluid-tight relation, a member engaging the tubular member, means for urging the last mentioned member toward the apertured member to maintain the parts in fluid-tight relation, and a valve positioned within said tubular member.

In witness whereof, I hereunto subscribe my name this 25th day of February A. D. 1930.

JOHN E. BOYNTON.